(12) United States Patent
Zhang

(10) Patent No.: US 11,429,001 B2
(45) Date of Patent: Aug. 30, 2022

(54) LIQUID CRYSTAL DISPLAY PANEL AND LIQUID CRYSTAL DISPLAY DEVICE

(71) Applicant: WUHAN CHINA STAR OPTOELECTRONICS TECHNOLOGY CO., LTD, Hubei (CN)

(72) Inventor: Guiyang Zhang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 239 days.

(21) Appl. No.: 16/955,105

(22) PCT Filed: Mar. 16, 2020

(86) PCT No.: PCT/CN2020/079468
§ 371 (c)(1),
(2) Date: Jun. 18, 2020

(87) PCT Pub. No.: WO2021/114504
PCT Pub. Date: Jun. 17, 2021

(65) Prior Publication Data
US 2021/0181589 A1  Jun. 17, 2021

(30) Foreign Application Priority Data
Dec. 13, 2019  (CN) .......................... 201911289008.3

(51) Int. Cl.
*G02F 1/1362* (2006.01)
*G06V 40/13* (2022.01)

(52) U.S. Cl.
CPC .. *G02F 1/136222* (2021.01); *G02F 1/136209* (2013.01); *G06V 40/1318* (2022.01)

(58) Field of Classification Search
None
See application file for complete search history.

(56) References Cited

U.S. PATENT DOCUMENTS

| 10,665,631 B1 | 5/2020 | Cai et al. |
| 2013/0181120 A1 | 7/2013 | Shinto et al. |
| (Continued) | | |

FOREIGN PATENT DOCUMENTS

| CN | 106773219 A | 5/2017 |
| CN | 106773229 A | 5/2017 |
| (Continued) | | |

*Primary Examiner* — Richard H Kim
(74) *Attorney, Agent, or Firm* — Mark M. Friedman

(57) ABSTRACT

A liquid crystal display panel and a liquid crystal display device are provided. The liquid crystal display panel includes a color film substrate, an array substrate disposed opposite to the color filter substrate, and a liquid crystal layer disposed between the color filter substrate and the array substrate. The color film substrate includes color filter layers arranged into an upper and a lower layer, positions of the upper and lower layers corresponding one-to-one, and colors thereof corresponding with a same color. A fingerprint recognition unit is disposed between the color film substrate and the array substrate. When fingerprint recognition is performed, the upper layer blocks large-angle reflection light of fingerprints and improve a "signal-to-noise ratio" of reflection light of the fingerprints emitted to the fingerprint recognition unit, thereby improving accuracy of the fingerprint recognition. The liquid crystal display device of the invention includes the above liquid crystal display panel.

18 Claims, 4 Drawing Sheets

(56) References Cited

U.S. PATENT DOCUMENTS

2018/0239455 A1* 8/2018 Jia ........................ G06V 40/13
2019/0056613 A1 2/2019 Wang et al.
2020/0327299 A1 10/2020 Wu et al.

FOREIGN PATENT DOCUMENTS

| | | |
|---|---|---|
| CN | 106873063 A | 6/2017 |
| CN | 109445161 A | 3/2019 |
| CN | 110222600 A | 9/2019 |
| CN | 110222620 A | 9/2019 |
| CN | 110244482 A | 9/2019 |
| CN | 110275341 A | 9/2019 |
| CN | 110286514 A | 9/2019 |
| CN | 110286717 A | 9/2019 |
| CN | 110426888 A | 11/2019 |
| CN | 110426891 A | 11/2019 |
| CN | 110441944 A | 11/2019 |
| CN | 110471208 A | 11/2019 |
| CN | 209765526 U | 12/2019 |
| CN | 110796055 A | 2/2020 |
| KR | 20150029129 A | 3/2015 |

* cited by examiner

LIQUID CRYSTAL DISPLAY PANEL AND LIQUID CRYSTAL DISPLAY DEVICE

CROSS REFERENCE TO RELATED APPLICATIONS

This application claims priority to a Chinese patent application filed on Dec. 13, 2019 at National Intellectual Property Administration (CNIPA) having application number 201911289008.3, titled: "Liquid Crystal Display Panel and Liquid Crystal Display Device", the entire contents of which being incorporated herein.

FIELD OF INVENTION

The present disclosure relates to the field of display technology, and more particularly, to a liquid crystal display panel and a liquid crystal display device.

BACKGROUND OF INVENTION

Optical fingerprint recognition is the earliest fingerprint recognition technology. Earlier optical fingerprint recognition technology required a relatively large optical path system, so it was mostly used for larger devices such as access control and punch cards. In order to protect personal privacy and financial security, fingerprint recognition technology has been gradually applied to portable display devices such as mobile phones and tablets. However, due to the small size of these portable display devices, traditional optical fingerprint recognition technology cannot meet these demands, so capacitive fingerprint recognition technology has been developed.

Although capacitive fingerprint recognition technology is suitable for smaller devices, it cannot be integrated into display panels and needs to occupy an individual region, so it is no longer suitable for rising "full screen" display devices. Optical fingerprint recognition technology is a technology that uses fingerprint reflection light to identify fingerprint characteristics. The reflection light can pass through transparent display panels and reach into the display panels. Therefore, optical fingerprint recognition modules can be integrated in a display region of the display panels, which is beneficial to the "full screen" design of mobile phones and other devices.

However, many problems occur in integrating optical fingerprint recognition modules in liquid crystal display panels. Since the liquid crystal display panel requires a backlight to provide a light source, the backlight reflected by the fingerprints will generate more interference signals in a fingerprint recognition region, and a greater number of large-angle reflection light will be emitted to the fingerprint recognition modules. The accuracy of fingerprint recognition of the fingerprint recognition module is affected by a "signal-to-noise ratio" ("signal-to-noise ratio" refers to a ratio of small-angle reflection light to large-angle reflection light). When a greater number of large-angle reflection light is emitted to the fingerprint recognition modules, a decrease in "signal-to-noise ratio" occurs, and the accuracy of the fingerprint recognition is reduced, and may even fail entirely.

SUMMARY OF INVENTION

Optical fingerprint recognition modules integrated in liquid crystal display panels is affected by large-angle reflection light of the fingerprints, and its "signal-to-noise ratio" is low, and accuracy of fingerprint recognition is low.

In order to solve the above problems, the present disclosure provides technical solutions as follows.

The present disclosure provides a liquid crystal display panel. The liquid crystal display panel comprises a color film substrate. The color film substrate comprises two color filter layers arranged into an upper and a lower layer, positions of the upper color filter layer and the lower color filter layer corresponding one to one, and colors thereof corresponding to a same color. An array substrate is disposed opposite to the color film substrate. A liquid crystal is disposed between the color film substrate and the array substrate. A fingerprint recognition unit is disposed between the color film substrate and the array substrate, the fingerprint recognition unit identifies fingerprint characteristics by receiving reflection light of a fingerprint passing through the color film substrate.

In the display panel of the present disclosure, each of the color filter layers respectively comprises a plurality of color filter blocks, a black matrix is disposed between the color filter blocks, and the black matrix is used to prevent light from passing through the two adjacent color filter blocks from interfering with each other.

In the display panel of the present disclosure, a position of the fingerprint recognition unit corresponds to a position of the black matrix along a thickness direction of the liquid crystal display panel. A region perpendicularly corresponding to the black matrix and the fingerprint recognition unit is an aperture region, thereby ensuring that light is emitted to the fingerprint recognition unit through the aperture region.

In the display panel of the present disclosure, the color film substrate comprises a glass substrate, a first color filter layer disposed on an upper surface of the glass substrate, and a second color filter layer disposed on a lower surface of the glass substrate, positions of the first color filter layer and the second color filter layer corresponding one to one, and colors thereof corresponding to a same color.

In the display panel of the present disclosure, the first color filter layer and the second color filter layer respectively comprise a red filter block, a green filter block, and a blue filter block.

In the display panel of the present disclosure, the black matrix comprises a horizontal matrix line and a vertical matrix line, the horizontal matrix line and the vertical matrix line divide the color filter layer into a plurality of filter regions, and the color filter blocks are filled in the filter regions.

In the display panel of the present disclosure, the fingerprint recognition unit is disposed on a surface of the array substrate facing the liquid crystal layer.

In the display panel of the present disclosure, a vertical projection region of the fingerprint recognition unit on the black matrix is located on the horizontal matrix line.

In the display panel of the present disclosure, a vertical projection region of the fingerprint recognition unit on the black matrix is located on the vertical matrix line.

In the display panel of the present disclosure, the vertical projection region of the fingerprint recognition unit on the black matrix is arranged parallel to the color filter block.

In the display panel of the present disclosure, the fingerprint recognition unit is disposed on a surface of the color filter substrate facing the liquid crystal layer.

In the display panel of the present disclosure, the fingerprint recognition unit is arranged on the horizontal matrix line.

In the display panel of the present disclosure, the fingerprint recognition unit is arranged on the vertical matrix line.

In the display panel of the present disclosure, the fingerprint recognition unit is arranged on the vertical matrix line and is arranged parallel to the color filter block.

In the display panel of the present disclosure, a filter film is disposed on a surface of the fingerprint recognition unit that receives light, and the filter film is used to filter light directing to the fingerprint recognition unit into a monochromatic light.

The present disclosure further provides a liquid crystal display device comprising the liquid crystal display panel as above mentioned and a backlight module disposed on a back side of the liquid crystal display panel and used to provide a backlight for the liquid crystal display panel.

In the display device of the present disclosure, each of the color filter layers respectively comprises a plurality of color filter blocks in the liquid crystal display panel, a black matrix is disposed between the color filter blocks, and the black matrix is used to prevent light from passing through the two adjacent color filter blocks from interfering with each other.

In the display device of the present disclosure, a position of the fingerprint recognition unit corresponds to a position of the black matrix along a thickness direction of the liquid crystal display panel, and a region perpendicularly corresponding to the black matrix and the fingerprint recognition unit is an aperture region.

In the display device of the present disclosure, the color film substrate comprises a glass substrate, a first color filter layer disposed on an upper surface of the glass substrate, and a second color filter layer disposed on a lower surface of the glass substrate, positions of the first color filter layer and the second color filter layer corresponding one to one, and colors thereof corresponding to a same color.

In the display device of the present disclosure, the black matrix comprises a horizontal matrix line and a vertical matrix line, the horizontal matrix line and the vertical matrix line divide the color filter layer into a plurality of filter regions, and the color filter blocks are filled in the filter regions. The fingerprint recognition unit is arranged corresponding to the horizontal matrix line, or the fingerprint recognition unit is arranged corresponding to the vertical matrix line.

The present disclosure provides a liquid crystal display panel and a liquid crystal display device that comprise a color film substrate comprising two color filter layers in an upper and lower layer arrangement and a fingerprint recognition unit disposed on a lower side of the color film substrate. When the fingerprint recognition is performed, the upper color filter layer can block large-angle reflection light of the fingerprints and improve "signal-to-noise ratio" of reflection light of the fingerprints emitted to the fingerprint recognition unit, thereby improving the accuracy of the fingerprint recognition.

DESCRIPTION OF DRAWINGS

In order to more clearly illustrate the technical solutions of the embodiments of the present invention, the drawings used in the description of the embodiments will be briefly described as below. Obviously, the drawings described as below are just some embodiments of the present invention. For one of ordinary skill in the art, under the premise of no creative labor, other drawings can also be obtained according to these drawings.

DETAILED DESCRIPTION OF PREFERRED EMBODIMENTS

The following descriptions of embodiments are with reference to additional drawings to illustrate specific embodiments that can be implemented by the present disclosure. The directional terms described by the present disclosure, such as "upper", "lower", "front", "back", "left", "right", "inner", "outer", "side", etc., are only directions by referring to the accompanying drawings. The directional terms used herein are used to explain and explain the present disclosure, rather than to limit the present disclosure. In figures, elements with same structures are indicated by same numbers, and elements with similar structures or functions are indicated by similar numbers.

An embodiment of the present disclosure provides a liquid crystal display panel, a color film substrate of the liquid crystal display panel comprising two color filter layers in an upper and lower layer arrangement, and a fingerprint recognition unit is disposed on a lower side of color film substrate. The upper color filter layer is used to block large-angle reflection light of the fingerprints and improve a "signal-to-noise ratio" of reflection light of the fingerprints emitted to the fingerprint recognition unit, thereby improving the accuracy of the fingerprint recognition. In the liquid crystal display panel provided by the embodiment of the present disclosure, the fingerprint recognition unit is integrated into the display panel without an individual fingerprint recognition region, which can achieve fingerprint recognition of "full screen" devices.

Figure 1:
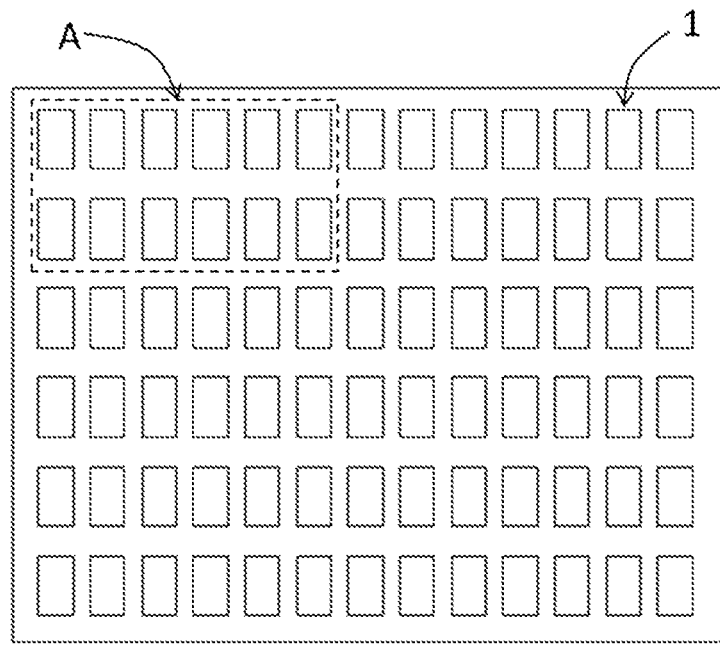
FIG. 1 is a top view of a liquid crystal display panel provided by an embodiment of the present disclosure.

As shown in FIG. 1, it is a schematic plan view of the liquid crystal display panel provided by the embodiment of the present disclosure. The liquid crystal display panel comprises a plurality of sub-pixel units 1. It should be understood that each of the sub-pixel units 1 corresponds to color filter units on a color film substrate of the liquid crystal display panel, and the color film substrate can comprise the color filter units having a plurality of colors, so that the liquid crystal display panel can achieve color display.

Figure 2:
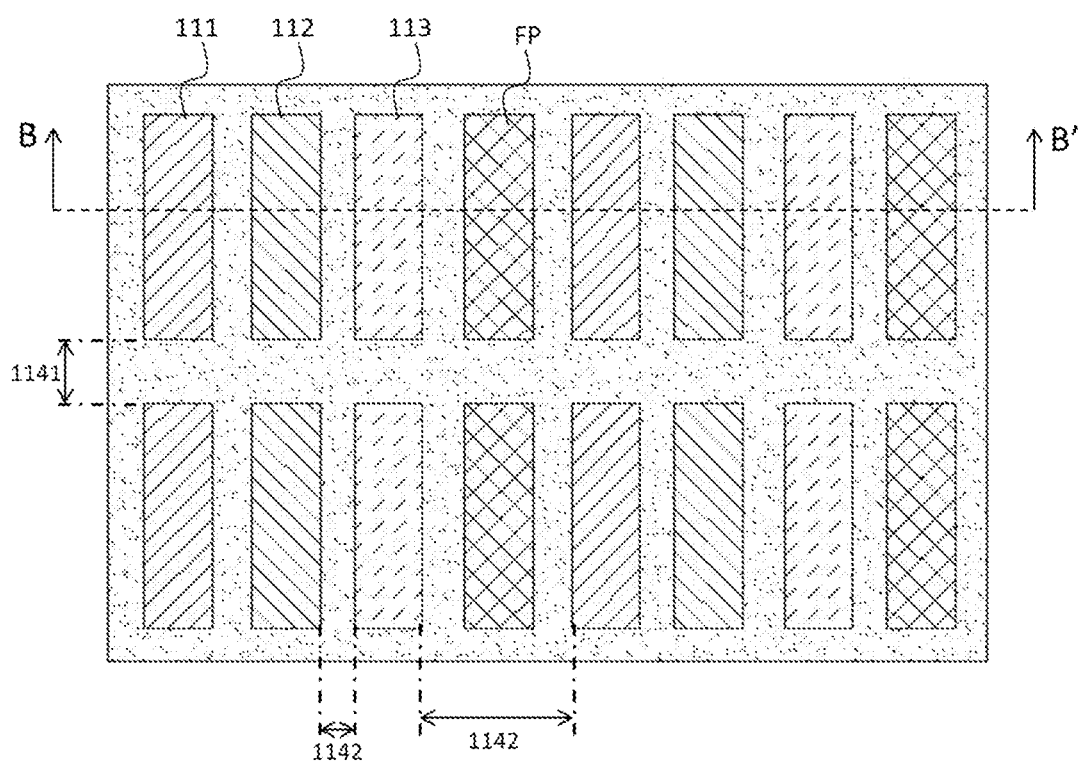
FIG. 2 is a partially enlarged diagram of a region A of one of embodiments of the liquid crystal display shown in FIG. 1.
Figure 3:
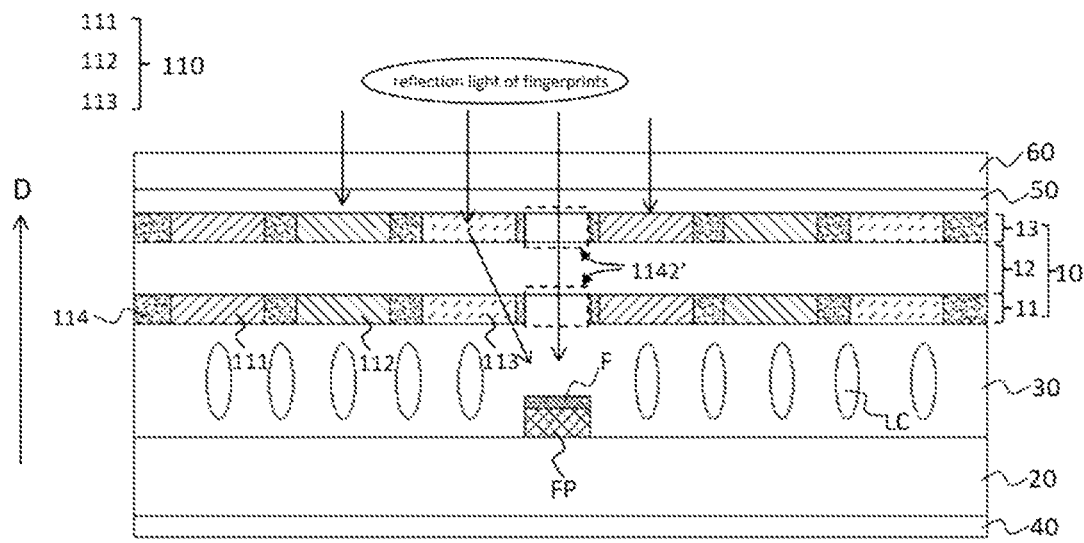
FIG. 3 is a cross-sectional diagram along a B-B' line of the embodiment of the liquid crystal display shown in FIG. 2, and a fingerprint recognition unit is disposed on an array substrate in the present embodiment.

As shown in FIG. 2 and FIG. 3, FIG. 2 is a partially enlarged diagram of a region A of one of embodiments of the liquid crystal display shown in FIG. 1, and FIG. 3 is a cross-sectional diagram along B-B' line of the embodiment of the liquid crystal display shown in FIG. 2. The liquid crystal display panel provided by the present embodiment comprises a color film substrate 10, an array substrate 20 disposed opposite to the color film substrate 10, and a liquid crystal layer 30 disposed between the color film substrate 10 and the array substrate 20, and the liquid crystal layer 30 is filled with liquid crystals (LCs).

The color film substrate 10 comprises two color filter layers in an upper and lower layer arrangement, positions of the upper color filter layer and the lower color filter layer correspond one to one, and colors thereof correspond with the same color. The color filter layers of the color film substrate 10 comprise a plurality of colors, and the liquid crystal display panel achieves color display through a combination of a plurality of colors.

Specifically, the color film substrate 10 comprises a glass substrate 12, a first color filter layer 13 disposed on an upper surface of the glass substrate 12, and a second color filter layer 11 disposed on a lower surface of the glass substrate. The first color filter layer 13 and the second color filter layer 11 respectively comprise color filter blocks 110 having a plurality of different colors. Along a thickness direction of the liquid crystal display panel, namely a first direction D shown in FIG. 3, positions of the color filter blocks of the first color filter layer 13 correspond one-to-one to positions of the color filter blocks of the second color filter layer 11, and the corresponding color filter blocks of the first color filter layer and the color filter blocks of the second color filter layer along the first direction D have the same color. Each group of the color filter blocks 110 corresponding to one another up and down along the first direction D respectively forms a color filter unit.

Furthermore, the first color filter layer 13 and the second color filter layer 11 respectively comprise a red filter block 111, a green filter block 112, and a blue filter block 113. Along the first direction D, the color filter block of the first color filter layer 13 corresponding to the red filter block 111 of the second color filter layer 11 is also a red filter block 111, the color filter block of the first color filter layer 13 corresponding to the green filter block 112 of the second color filter layer 11 is also a green filter block 112, and the color filter block of the first color filter layer 13 corresponding to the blue filter block 113 of the second color filter layer 11 is also a blue filter block 113.

Furthermore, a black matrix 114 is respectively disposed between the color filter blocks 110 of the first color filter layer 13 and between the color filter blocks 110 of the second color filter layer 11, and the black matrix is used to prevent light from passing through the two adjacent color filter blocks 110 from interfering with each other. The black matrix 114 comprises a horizontal matrix line 1141 used for dividing the color filter block 110 into columns and a vertical matrix line 1142 used for dividing the color filter block 110 into rows; that is, the horizontal matrix line 1141 and the vertical matrix line 1142 divide the first color filter layer 13 and the second color filter layer 11 into a plurality of filter regions, and the color filter blocks are filled in the filter regions.

The array substrate 20 is disposed opposite to the color filter substrate 10, and the liquid crystal layer 30 is filled between the array substrate 20 and the color filter substrate 10. The array substrate 20 is disposed with functional elements such as scan lines, data lines, pixel electrodes, and thin film transistors. The array substrate 20 is used to control deflection of the liquid crystals (LCs) in the liquid crystal layer 30 to achieve function of displaying images on the liquid crystal display panel.

A fingerprint recognition unit FP is disposed between the color filter substrate 10 and the array substrate 20, and the fingerprint recognition unit FP identifies fingerprint characteristics by receiving fingerprint reflection light reflected by the fingerprints and passing through the color filter substrate. Moreover, the fingerprint recognition unit FP may be a photoelectric sensor. When the fingerprint recognition is performed, the fingerprint recognition unit FP receives light reflected by the fingerprints, converts the light into an electrical signal, and calculates structural characteristics of the fingerprints through an algorithm processing unit to achieve fingerprint recognition. It should be noted that the liquid crystal display panel provided by the present embodiment may comprise a plurality of the fingerprint recognition units FP electrically connected to the algorithm processing unit, each of the fingerprint recognition units FP respectively identifies a fingerprint feature in a partial region, and the algorithm processing unit integrates fingerprint signals identified by a plurality of the fingerprint recognition units FP to form a complete fingerprint feature.

A vertical projection region of the fingerprint recognition unit FP on the first color filter layer 13 or the second color filter layer 11 is located on the vertical matrix line 1142. Along the first direction D, a region of the vertical matrix line 1142 corresponding to the fingerprint recognition unit FP is an aperture region 1142', and the aperture region 1142' is disposed on both the first color filter layer 13 and the second color filter layer 11, thereby ensuring that reflection light of the fingerprints can be emitted to the fingerprint recognition unit FP through the aperture region 1142'.

In the present embodiment, the fingerprint recognition unit FP is disposed between the color filter substrate 10 and the array substrate 20, so that the reflection light of the fingerprints must first pass through the color filter substrate 10 to reach the fingerprint recognition unit FP. The color filter layer of the color filter substrate 10, especially the first color filter layer 13, is used to block large-angle reflection light of the fingerprints, so that most of the reflection light of the fingerprints received by the fingerprint recognition unit FP comes from a small partial region above the fingerprint recognition unit FP; that is, receiving a more small-angle reflection light of the fingerprints, which improves the "signal-to-noise ratio" of the reflection light of the fingerprints, thereby improving the accuracy of the fingerprint recognition of the fingerprint recognition unit FP.

According to one of embodiments of the present disclosure, as shown in FIG. 3, the fingerprint recognition unit FP is disposed on a surface of the array substrate 20 facing the liquid crystal layer 30. A region corresponding to the fingerprint recognition unit FP along the first direction D of the first color filter layer 13 and the second color filter layer 11 is the aperture region 1142'. The aperture region 1142' may allow the reflection light of the fingerprints directly above the fingerprint recognition unit FP to be emitted to the fingerprint recognition unit.

Moreover, the aperture region 1142' is located between the adjacent blue filter block 113 and the red filter block 111. The liquid crystal display panel may display a monochrome blue light image when the fingerprint recognition is performed. After blue light emitted by the liquid crystal display panel is reflected by the fingerprints, one part of the reflection light is emitted to the fingerprint recognition unit FP through the aperture region 1142', another part of the reflection light is refracted by the blue filter block 113 to be emitted to the fingerprint recognition unit FP, and the other part of the reflection light emitted to the black matrix 114, the red filter block 111, and the green filter block 112 is blocked from passing through the color filter substrate 10. Therefore, the reflection light of the fingerprints received by the fingerprint recognition unit FP is ensured to be the reflection light of the fingerprints in a small region above the fingerprint recognition unit, eliminating interference of the reflection light of the fingerprints in other regions and improving the accuracy of the fingerprint recognition. Similarly, the liquid crystal display panel may display a monochrome red light image when the fingerprint recognition is performed. The propagation principle of the reflection light of the fingerprints is same as above, and is not repeated here.

Moreover, the aperture region 1142' may also be located between the adjacent red filter block 111 and the green filter block 112, or between the adjacent green filter block 112 and the blue filter block 113. For the embodiment in which the aperture region 1142' is located between the adjacent red filter block 111 and the green filter block 112, the liquid crystal display panel may display the monochrome red light image or a monochrome green light image when the fingerprint recognition is performed, and its propagation principle of the reflection light of the fingerprints is the same as the above. For the embodiment in which the aperture region 1142' is located between the adjacent green filter block 111 and the blue filter block 112, the liquid crystal display panel may display a monochrome green light image or a monochrome blue light image when the fingerprint recognition is performed, and its propagation principle of the reflection light of the fingerprints is the same as the above, so it is not repeated here.

Moreover, a filter film F is disposed on a surface of the fingerprint recognition unit FP that receives the reflection light of fingerprints, and the filter film F is used to filter the reflection light of fingerprints directing to the fingerprint recognition unit FP into a monochromatic light; for example, the filter film F can filter the reflection light of fingerprints into a monochrome blue light or a monochrome green light, or a monochrome red light. It should be understood that, for the embodiment in which the filter film F is disposed on the surface of the fingerprint recognition unit FP, the liquid crystal display panel may display color images when fingerprint recognition is performed. As an example, the aperture region 1142' is located between the adjacent blue filter block 113 and the red filter block 111, and the filter film F filters the reflection light of fingerprints into the monochrome blue light. One part of a color light reflected by fingerprints is emitted to the fingerprint recognition unit FP through the aperture region 1142', and is filtered into the monochrome blue light by the filter film F, another part of the color light reflected by the fingerprints passes through filtering and refraction of the blue filter block 113 and is emitted to the fingerprint recognition unit FP in a form of the monochrome blue light, and the other part of the color light reflected by the fingerprints passes through the filtering and the refraction of the red filter block 111 or the green filter block 112, and is emitted to the fingerprint recognition unit FP in a form of a monochromatic red light or a monochromatic green light, and is blocked by the filter film F. Therefore, the reflection light of the fingerprints received by the fingerprint recognition unit FP is ensured to come from a small region above thereof, and the accuracy of the fingerprint recognition of the fingerprint recognition unit can be ensured.

Moreover, the liquid crystal display panel provided by the present embodiment further comprises a lower polarizer 40 disposed on a lower side of the array substrate 20, an upper polarizer 50 disposed on an upper side of the color filter substrate 10, and a glass cover 60 disposed on an upper side of the upper polarizer 50. The upper polarizer 50 and the lower polarizer 40 are used to adjust the polarization direction of light entering and exiting the liquid crystal display panel to improve quality of display images of the display panel.

Figure 4:
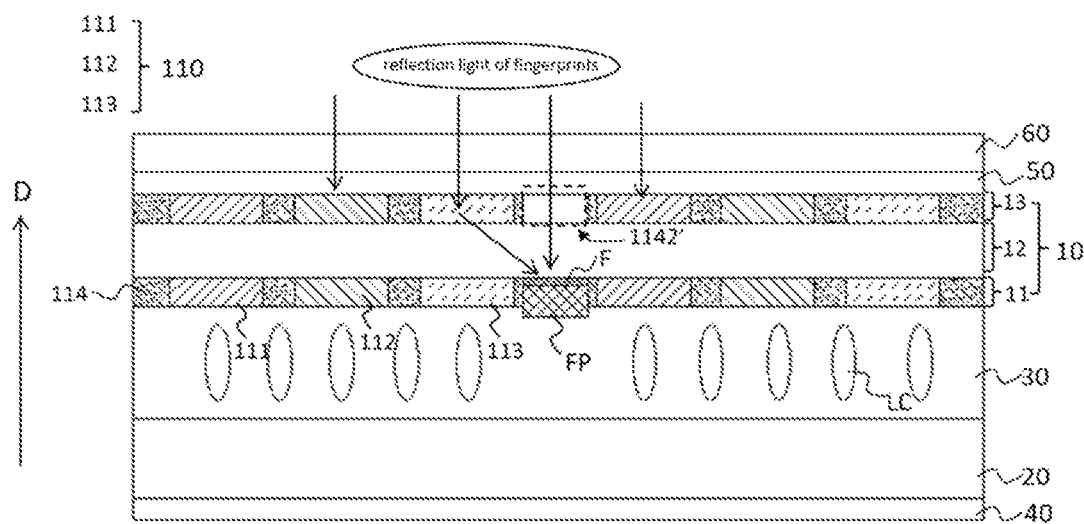
FIG. 4 is a cross-sectional diagram along the B-B' line of another embodiment of the liquid crystal display shown in FIG. 2, and the fingerprint recognition unit is disposed on a color film substrate in the present embodiment.

According to one of embodiments of the present disclosure, as shown in FIG. 2 and FIG. 4, wherein FIG. 4 is a cross-sectional diagram along the B-B' line of another embodiment of the liquid crystal display shown in FIG. 2. In the present embodiment, the fingerprint recognition unit FP is disposed on a surface of the color filter substrate 11 facing the liquid crystal layer 30. Specifically, the fingerprint recognition unit FP is disposed on the vertical matrix line 1142 of the second color filter layer 11, and a region where the vertical matrix line 1142 of the fingerprint recognition unit FP is set in a hollowed-out region; that is, the fingerprint recognition unit FP is directly disposed on the glass substrate 12. Along the first direction D, the aperture region 1142' is disposed on the longitudinal matrix line 1142 of the first color filter layer 13 corresponding to the fingerprint recognition unit FP. Moreover, the filter film F is disposed on a surface of the fingerprint recognition unit FP that receives the reflection light of the fingerprints.

It should be noted that the difference between the present embodiment and the embodiment in which the fingerprint recognition unit FP is disposed on the array substrate 20 is only that an installation position of the fingerprint recognition unit FP is different, and the other structural features are completely the same. Therefore, the present embodiment has all beneficial effects of the embodiment in which the fingerprint recognition unit FP is disposed on the array substrate 20. In addition, compared with the embodiment in which the fingerprint recognition unit FP is disposed on the array substrate 20, the fingerprint recognition unit FP of the present embodiment is disposed above the liquid crystal layer 30, and the reflection light of the fingerprints can reach the fingerprint recognition unit FP without passing through the liquid crystal layer 30, which eliminates interference of the liquid crystal layer 30 on the reflection light of the fingerprints, and further improves the accuracy of the fingerprint recognition of the fingerprint recognition unit FP.

Figure 5:
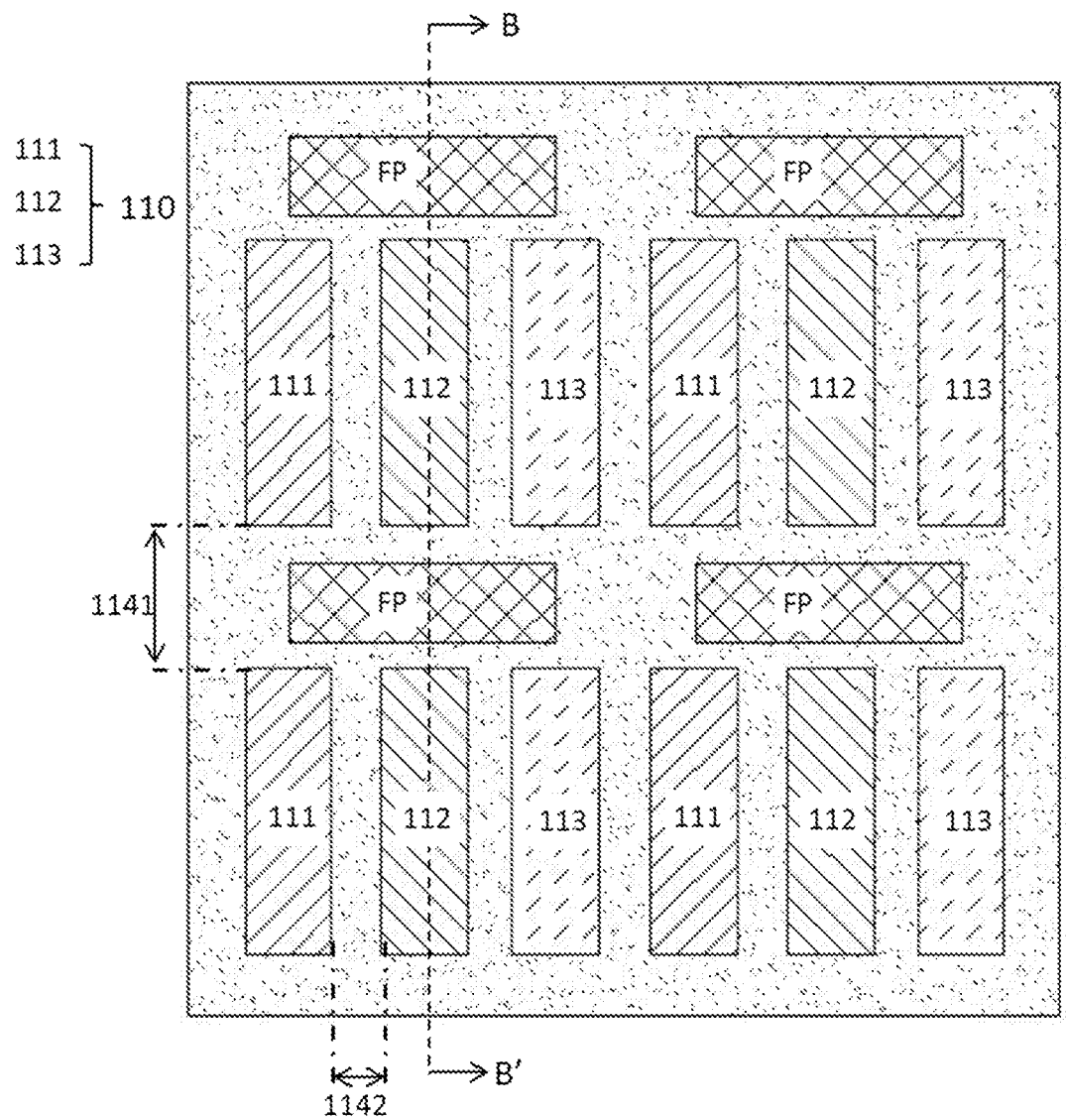
FIG. 5 is a partially enlarged diagram of the region A of another embodiment of the liquid crystal display shown in FIG. 1.
Figure 6:
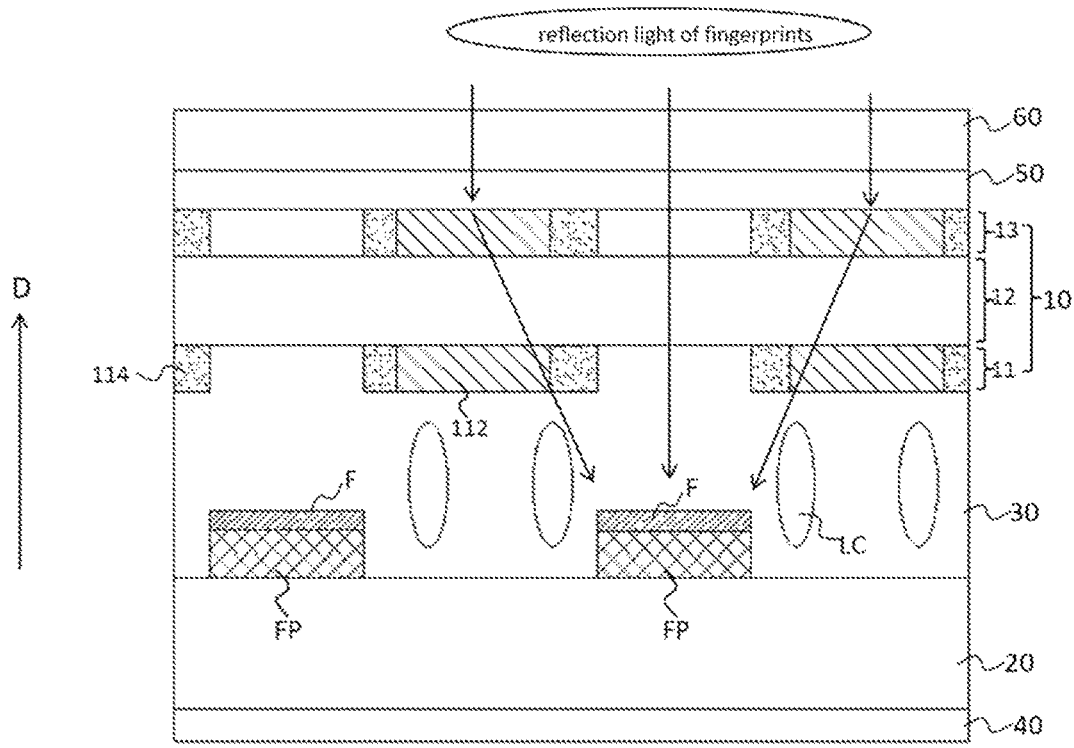
FIG. 6 is a cross-sectional diagram along the B-B' line of the embodiment of the liquid crystal display shown in FIG. 5, and the fingerprint recognition unit is disposed on the array substrate in the present embodiment.

According to one of the embodiments of the present disclosure, as shown in FIG. 1, FIG. 5, and FIG. 6, wherein FIG. 5 is a partial enlarged diagram of the region A of another embodiment of the liquid crystal display shown in FIG. 1 and FIG. 6 is a cross-sectional diagram along the B-B' line of the embodiment of the liquid crystal display shown in FIG. 5, in the present embodiment, a vertical projection region of the fingerprint recognition unit FP on the black matrix 114 is located on the horizontal matrix line 1141. Specifically, the fingerprint recognition unit FP is disposed on a surface of the array substrate 20 facing the liquid crystal layer 30. Moreover, a filter film F is disposed on the surface of the fingerprint recognition unit FP that receives light reflected by the fingerprints. Compared with the above embodiments, the present embodiment only adjusts a spatial position of the fingerprint recognition unit FP, and other structural features are the same as the above embodiments, and the principle in realizing an improvement of the accuracy of the fingerprint recognition of the fingerprint recognition unit FP is the same as the above embodiments. Therefore, the present embodiment has all the beneficial effects of the above.

Figure 7:
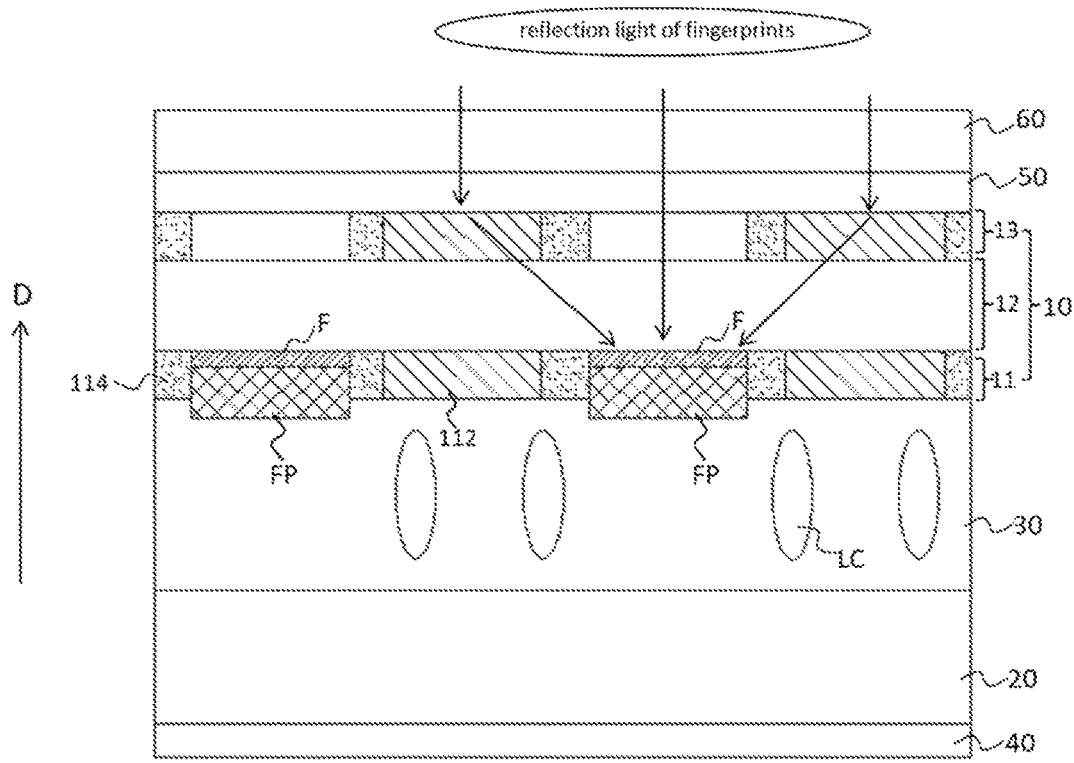
FIG. 7 is a cross-sectional diagram along the B-B' line of another embodiment of the liquid crystal display shown in FIG. 5, and the fingerprint recognition unit is disposed on the color film substrate in the present embodiment.

According to one of the embodiments of the present disclosure, as shown in FIG. 5 and FIG. 7, wherein FIG. 7 is a cross-sectional diagram along the B-B' line of another embodiment of the liquid crystal display shown in FIG. 5, the fingerprint recognition unit is disposed on the color film substrate in the present embodiment. In the present embodiment, the vertical projection region of the fingerprint recognition unit FP on the black matrix 114 is located on the horizontal matrix line 1141. Specifically, the fingerprint recognition unit FP is disposed on the horizontal matrix line 1141 of the second color filter layer 11, and a region where the horizontal matrix line 1142 of the fingerprint recognition unit FP is set in a hollowed-out region; that is, the fingerprint recognition unit FP is directly disposed on the glass substrate 12. Moreover, the filter film F is disposed on the surface of the fingerprint recognition unit FP that receives the reflection light of the fingerprints.

It should be noted that the difference between the present embodiment and the above-mentioned embodiments in which the fingerprint recognition unit FP is disposed on the array substrate 20 is only that the an installation position of the fingerprint recognition unit FP is different, and other structural features are completely the same. Therefore, the present embodiment has all beneficial effects of the embodiment in which the fingerprint recognition unit FP is disposed on the array substrate 20. In addition, compared with the embodiment in which the fingerprint recognition unit FP is disposed on the array substrate 20, the fingerprint recognition unit FP of the present embodiment is disposed above the liquid crystal layer 30, and the reflection light of the fingerprints can reach the fingerprint recognition unit FP without passing through the liquid crystal layer 30, which eliminates interference of the liquid crystal layer 30 on the reflection light of the fingerprints, and further improves the accuracy of the fingerprint recognition of the fingerprint recognition unit FP.

In summary, the liquid crystal display panel provided by the embodiment of the present disclosure comprises the color film substrate comprising two color filter layers in the upper and lower layer arrangement, and a fingerprint recognition unit is disposed on a lower side of the color film substrate. The upper color filter layer is used to block the large-angle reflection light of the fingerprints and improve "signal-to-noise ratio" of reflection light of the fingerprints emitted to the fingerprint recognition unit, thereby improving the accuracy of the fingerprint recognition.

Another embodiment of the present disclosure provides a liquid crystal display device, and the liquid crystal display device comprises the liquid crystal display panel provided by the above embodiment, and a backlight module disposed on a back side of the liquid crystal display panel and used to provide a backlight for the liquid crystal display panel. Since the liquid crystal display device provided by the present embodiment comprises the liquid crystal display panel provided by the above embodiments, it has following beneficial effects: the liquid crystal display device uses the color filter substrate comprising the upper filter layer and the lower color filter layer to block the large-angle reflection light of the fingerprints, so as to improve the "signal-to-noise ratio" of the reflection light of the fingerprints emitted to the fingerprint recognition unit, thereby improving the accuracy of the fingerprint recognition of the fingerprint recognition unit. Therefore, the liquid crystal display device has excellent fingerprint recognition capabilities.

As mentioned above, while the present disclosure has been disclosed via preferred embodiments as above, the preferred embodiments are not intended to limit the disclosure. Those skilled in the art can make various modifications and alternations without departing from the spirit and scope of the disclosure. The scope of protection of the disclosure is defined by the claims.

What is claimed is:

1. A liquid crystal display panel, comprising:
a color film substrate, wherein the color film substrate comprises a glass substrate, a first color filter layer disposed on an upper surface of the glass substrate, and a second color filter layer disposed on a lower surface of the glass substrate, each of the first color filter layer and the second color filter layer respectively comprises a plurality of color filter blocks, positions of the color filter blocks of the first color filter layer and the second color filter layer correspond to each other by one to one, and colors of the color filter blocks of the first color filter layer and the second color filter layer at a same corresponding position correspond to a same color;
an array substrate disposed opposite to the color film substrate; and
a liquid crystal layer disposed between the color film substrate and the array substrate;
wherein a fingerprint recognition unit is disposed between the color film substrate and the array substrate, and the fingerprint recognition unit identifies fingerprint characteristics by receiving reflected light of a fingerprint passing through the color film substrate.

2. The liquid crystal display panel as claimed in claim 1, wherein a black matrix is disposed between the color filter blocks.

3. The liquid crystal display panel as claimed in claim 2, wherein a position of the fingerprint recognition unit corresponds to a position of the black matrix along a thickness direction of the liquid crystal display panel; and
a region perpendicularly corresponding to the black matrix and the fingerprint recognition unit is an aperture region, and light is directed to the fingerprint recognition unit through the aperture region.

4. The liquid crystal display panel as claimed in claim 3, wherein the black matrix comprises a horizontal matrix line and a vertical matrix line, the horizontal matrix line and the vertical matrix line divide both the first color filter layer and the second color filter layer into a plurality of filter regions, and the color filter blocks are filled in the filter regions.

5. The liquid crystal display panel as claimed in claim 4, wherein the fingerprint recognition unit is disposed on a surface of the array substrate facing the liquid crystal layer.

6. The liquid crystal display panel as claimed in claim 5, wherein a vertical projection region of the fingerprint recognition unit on the black matrix is located on the horizontal matrix line.

7. The liquid crystal display panel as claimed in claim 5, wherein a vertical projection region of the fingerprint recognition unit on the black matrix is located on the vertical matrix line.

8. The liquid crystal display panel as claimed in claim 7, wherein the vertical projection region of the fingerprint recognition unit on the black matrix is arranged parallel to the color filter blocks.

9. The liquid crystal display panel as claimed in claim 4, wherein the fingerprint recognition unit is disposed on a surface of the color film substrate facing the liquid crystal layer.

10. The liquid crystal display panel as claimed in claim 9, wherein the fingerprint recognition unit is arranged on the horizontal matrix line.

11. The liquid crystal display panel as claimed in claim 9, wherein the fingerprint recognition unit is arranged on the vertical matrix line.

12. The liquid crystal display panel as claimed in claim 11, wherein the fingerprint recognition unit is arranged on the vertical matrix line and is arranged parallel to the color filter blocks.

13. The liquid crystal display panel as claimed in claim 1, wherein the first color filter layer and the second color filter layer respectively comprise a red filter block, a green filter block, and a blue filter block.

14. The liquid crystal display panel as claimed in claim 1, wherein a filter film is disposed on a surface of the fingerprint recognition unit, and the filter film is used to filter light reflected into the fingerprint recognition unit into a monochromatic light.

15. A liquid crystal device, comprising the liquid crystal display panel as claimed in claim 1; and
a backlight module disposed on a back side of the liquid crystal display panel.

16. The liquid crystal device as claimed in claim 15, wherein a black matrix is disposed between the color filter blocks.

17. The liquid crystal device as claimed in claim 16, wherein a position of the fingerprint recognition unit corresponds to a position of the black matrix along a thickness direction of the liquid crystal display panel, and a region perpendicularly corresponding to the black matrix and the fingerprint recognition unit is an aperture region.

18. The liquid crystal device as claimed in claim 15, wherein the black matrix comprises a horizontal matrix line and a vertical matrix line, the horizontal matrix line and the vertical matrix line divide both the first color filter layer and the second color filter layer into a plurality of filter regions, and the color filter blocks are filled in the filter regions; and the fingerprint recognition unit is arranged corresponding to the horizontal matrix line or the vertical matrix line.

* * * * *